(12) United States Patent
Mermelstein (10) Patent No.: US 10,144,641 B2
(45) Date of Patent: Dec. 4, 2018

(54) SYSTEM AND METHOD FOR HIGH PRESSURE, PASSIVE CONDENSING OF WATER FROM HYDROGEN IN A REVERSIBLE SOLID OXIDE FUEL CELL SYSTEM

(71) Applicant: The Boeing Company, Chicago, IL (US)

(72) Inventor: Joshua M. Mermelstein, Laguna Niguel, CA (US)

(73) Assignee: THE BOEING COMPANY, Chicago, IL (US)

( * ) Notice: Subject to any disclaimer, the term of this patent is extended or adjusted under 35 U.S.C. 154(b) by 567 days.

(21) Appl. No.: 14/748,979

(22) Filed: Jun. 24, 2015

(65) Prior Publication Data
US 2016/0377342 A1 Dec. 29, 2016

(51) Int. Cl.
| | |
|---|---|
| B01D 53/26 | (2006.01) |
| C01B 3/50 | (2006.01) |
| H01M 8/0656 | (2016.01) |
| H01M 8/04119 | (2016.01) |
| H01M 8/04291 | (2016.01) |
| C25B 15/08 | (2006.01) |
| C25B 1/08 | (2006.01) |
| H01M 8/124 | (2016.01) |

(52) U.S. Cl.
CPC .............. *C01B 3/50* (2013.01); *B01D 53/265* (2013.01); *C25B 1/08* (2013.01); *C25B 15/08* (2013.01); *H01M 8/04164* (2013.01); *H01M 8/04179* (2013.01); *H01M 8/04291* (2013.01); *H01M 8/0656* (2013.01); *C01B 2203/0495* (2013.01); *C01B 2203/066* (2013.01); *H01M 2008/1293* (2013.01); *H01M 2250/10* (2013.01); *Y02B 90/14* (2013.01); *Y02E 60/525* (2013.01)

(58) Field of Classification Search
None
See application file for complete search history.

(56) References Cited

U.S. PATENT DOCUMENTS

| | | | |
|---|---|---|---|
| 2005/0042488 A1* | 2/2005 | Niedzwiecki | H01M 8/04089 429/425 |
| 2006/0115691 A1* | 6/2006 | Hilmen | B01D 53/22 429/411 |
| 2008/0283126 A1* | 11/2008 | Joe | F15B 21/048 137/183 |

(Continued)

FOREIGN PATENT DOCUMENTS

CN 203670157 U * 6/2014

OTHER PUBLICATIONS

Translation of CN-203670157-U, accessed Jan. 30, 2018.*

*Primary Examiner* — Duane Smith
*Assistant Examiner* — Phillip Y Shao
(74) *Attorney, Agent, or Firm* — Parsons Behle & Latimer (57) ABSTRACT

A method for passively removing water from a stream of hydrogen gas includes receiving a stream of hydrogen gas that is water-saturated, having an initial pressure below about 1 psig and an initial temperature above about 25° C., compressing the stream of hydrogen gas to an elevated pressure, chilling the compressed stream of hydrogen gas to a low temperature, and condensing water from the compressed and chilled stream of hydrogen gas until the water content of the stream of hydrogen gas is below about 100 ppm.

20 Claims, 5 Drawing Sheets

(56) References Cited

U.S. PATENT DOCUMENTS

2010/0303605 A1\* 12/2010 Odle ................... B01D 53/265
                                                                                        415/1
2016/0060038 A1\* 3/2016 Oates ....................... B65G 5/00
                                                                                        405/56

\* cited by examiner

SYSTEM AND METHOD FOR HIGH PRESSURE, PASSIVE CONDENSING OF WATER FROM HYDROGEN IN A REVERSIBLE SOLID OXIDE FUEL CELL SYSTEM

GOVERNMENT RIGHTS

This invention was made with United States Government support under contract no. N394309-14-C-1487, awarded by the United States Department of Defense. The United States Government has certain rights in this invention.

FIELD OF THE DISCLOSURE

The present disclosure is related to removal of water from gaseous hydrogen. More particularly, the present disclosure relates to a system and method for high pressure, passive condensing of water from hydrogen produced by a Reversible Solid Oxide Fuel Cell (RSOFC) energy storage system.

BACKGROUND

Fuel cells are devices that convert chemical energy from a fuel, such as hydrogen, into electricity through a chemical reaction with oxygen or another oxidizing agent. There are several different types of fuel cells. Fuel cells generally include an anode, a cathode, and an electrolyte between the two. The most well-known type of fuel cell is the Proton Exchange Membrane (PEM) fuel cell, in which the electrolyte is a proton exchange membrane that allows ions (e.g. hydrogen ions) to pass through it, while electrons cannot. At the anode a catalyst oxidizes the hydrogen fuel, turning the fuel into positively charged ions and negatively charged electrons. The freed electrons travel through electrical conductors, thus producing the electric current output of the fuel cell. The hydrogen ions, on the other hand, travel through the proton exchange membrane to the cathode, where they react with a third chemical, usually oxygen, to create water vapor, which is typically exhausted as waste.

Another type of fuel cell is the solid oxide fuel cell (SOFC). Rather than a proton exchange membrane, the SOFC has a solid oxide or ceramic electrolyte. The solid oxide electrolyte conducts negative ions from the cathode to the anode, where the electrochemical oxidation of the oxygen ions with hydrogen occurs. Compared to PEM fuel cells, SOFC's can have higher efficiency, long-term stability, fuel flexibility, low emissions, and relatively low cost, in part because they do not include expensive platinum catalyst material. At the same time, SOFC's have higher operating temperatures than PEM fuel cells (typically between 500° C. and 1,000° C.), which results in longer start-up times, and they can experience degradation with repeated thermal cycling.

Fuel cells can theoretically work forward or backward. That is, they can operate to produce electricity from a given chemical reaction, or they can consume electricity to produce that chemical reaction. However, typical fuel cells, especially PEM fuel cells, are usually optimized for operating in one mode—either electricity generation mode or electrolysis mode—and are generally not built in such a way that they can be operated in both modes. Recently, however, reversible solid oxide fuel cells (RSOFC's) have been developed that can produce electricity from hydrogen fuel, or produce hydrogen fuel from electricity.

Because of these features, RSOFC's are considered good candidates for powering and storing energy on micro-grids. Micro-grids are local power distribution systems designed to supply local energy generation for both grid and off-grid connected facilities and communities, enabling a localized energy source in cases of emergencies or unreliable traditional grid use. The high cost and energy security issues associated with importing fuel to isolated or "islanded" grids has led to a growing desire to generate power onsite with alternative and renewable energy technologies, while reducing facility costs of importing electrical power. Energy storage is desirable to balance the micro-grid and improve efficiency, reduce fuel consumption, and provide power in the event of power outages. In order to stabilize a local power grid with continuous power, an RSOFC system can operate in Fuel Cell mode when needed, using the stored hydrogen to produce energy for the grid. This can allow for grid stabilization and improvement to power plant system efficiency.

Recently, there has also been interest in the energy sector in RSOFC's for energy storage, where they can be used in conjunction with renewable energy generation sources, such as wind and solar generation. In power generation systems, such as wind and solar energy systems, excess power must be stored or it is lost. Current systems available for storing energy present a variety of drawbacks, but RSOFC systems present a potential improvement in this area. Theoretically, excess power generated in off-peak hours can be sent to an RSOFC system operating in electrolysis mode to produce $H_2$, which is compressed and stored in tanks. The $H_2$ can then be used later in the same RSOFC system operating in fuel cell mode to provide supplemental power to the grid during peak hours or when specifically needed.

Notably, full scale application of RSOFC systems as energy storage and grid-stabilization systems has not previously been done. Consequently, many of the actual features that are needed for real world application of RSOFC's for energy storage and power grid stabilization have not previously been developed.

In making the first applications of this kind, it has been found that one challenge presented by RSOFC energy storage systems relates to the removal of water from the stream of $H_2$ gas produced by an RSOFC unit operating in electrolysis mode. Hydrogen gas produced by an RSOFC unit operating in electrolysis mode will typically be saturated with water, and at a relatively low pressure (e.g. below about 1 psig). It is desirable, however, to reduce the dew point of the gas below a level which will result in condensation of water in the storage containers for the gas. This water content level of the $H_2$ may be less than about 100 ppm prior to storage, which is considered an acceptable level for storage in commercial $H_2$ tubes. Consequently, additional water removal is desired. Unfortunately, typical water removal systems that have been used in preparing hydrogen gas for fuel cell use are unsuitable for use in an RSOFC system like that disclosed herein because they generally require a significant pressure differential, and they tend to lose a significant quantity of hydrogen in the process. Therefore typical water removal systems that require a sizeable pressure drop ahead of the compression step are not practical here.

The present disclosure is intended to address one or more of the above issues.

SUMMARY

It has been recognized that it would be desirable to have a method for removing water from a saturated $H_2$ product stream from an RSOFC unit operating in electrolysis mode at approximately atmospheric pressure.

It has also been recognized that it would be desirable to have a method for removing water from a saturated $H_2$ product stream from an RSOFC unit operating in electrolysis mode that is passive, and causes minimal loss of $H_2$.

In accordance with one aspect thereof, the present disclosure provides a method for passively removing water from a stream of hydrogen gas. The method includes receiving a stream of hydrogen gas that is water-saturated, having an initial pressure below about 1 psig and an initial temperature above about 25° C., compressing the stream of hydrogen gas to an elevated pressure, chilling the compressed stream of hydrogen gas to a low temperature, and condensing water from the compressed and chilled stream of hydrogen gas until the water content of the stream of hydrogen gas is below about 100 ppm.

In accordance with another aspect thereof, the present disclosure provides a method for passively removing water from a stream of saturated hydrogen gas produced from a Reversible Solid Oxide Fuel Cell (RSOFC) unit operating in electrolysis mode. The method includes receiving a stream of saturated hydrogen gas produced from an RSOFC unit operating in electrolysis mode, the stream of hydrogen gas having an initial pressure below about 0.5 psig and an initial temperature above about 25° C., compressing the stream of hydrogen gas with a compressor to a pressure above 1000 psig, and chilling the compressed stream of hydrogen gas to a temperature below about 10° C. The method further includes passively condensing water from the compressed and chilled stream of hydrogen gas to produce a water content of the stream of hydrogen gas below about 100 ppm, separating the water condensate from the $H_2$ gas, and storing the compressed hydrogen gas in a storage container for later use as fuel for the RSOFC unit.

In accordance with yet another aspect thereof, the present disclosure provides a system for passively removing water from a stream of hydrogen gas. The system includes a conduit, coupled to deliver a stream of saturated hydrogen gas having an initial pressure below about 1 psig and an initial temperature above about 25° C., a compressor, configured to compress the stream of hydrogen gas to an elevated pressure, a chiller, configured to chill the compressed stream of hydrogen gas to a low temperature, and a water trap, configured to passively receive water condensate from the compressed and chilled stream of hydrogen gas as the stream passes therethrough, and to separate the compressed and dewatered hydrogen from the condensate, the compressed and dewatered hydrogen having a water content of less than about 100 ppm.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

As noted above, in power generation systems, such as wind and solar energy systems, excess power must be stored or it is lost. Current systems for storing energy include flywheels, batteries, pump hydroelectric and compressed air storage, for example. Each of these methods present drawbacks that suggest the desirability of RSOFC energy storage systems. However, full scale application of RSOFC systems as energy storage and grid-stabilization devices has not previously been done.

Figure 1:
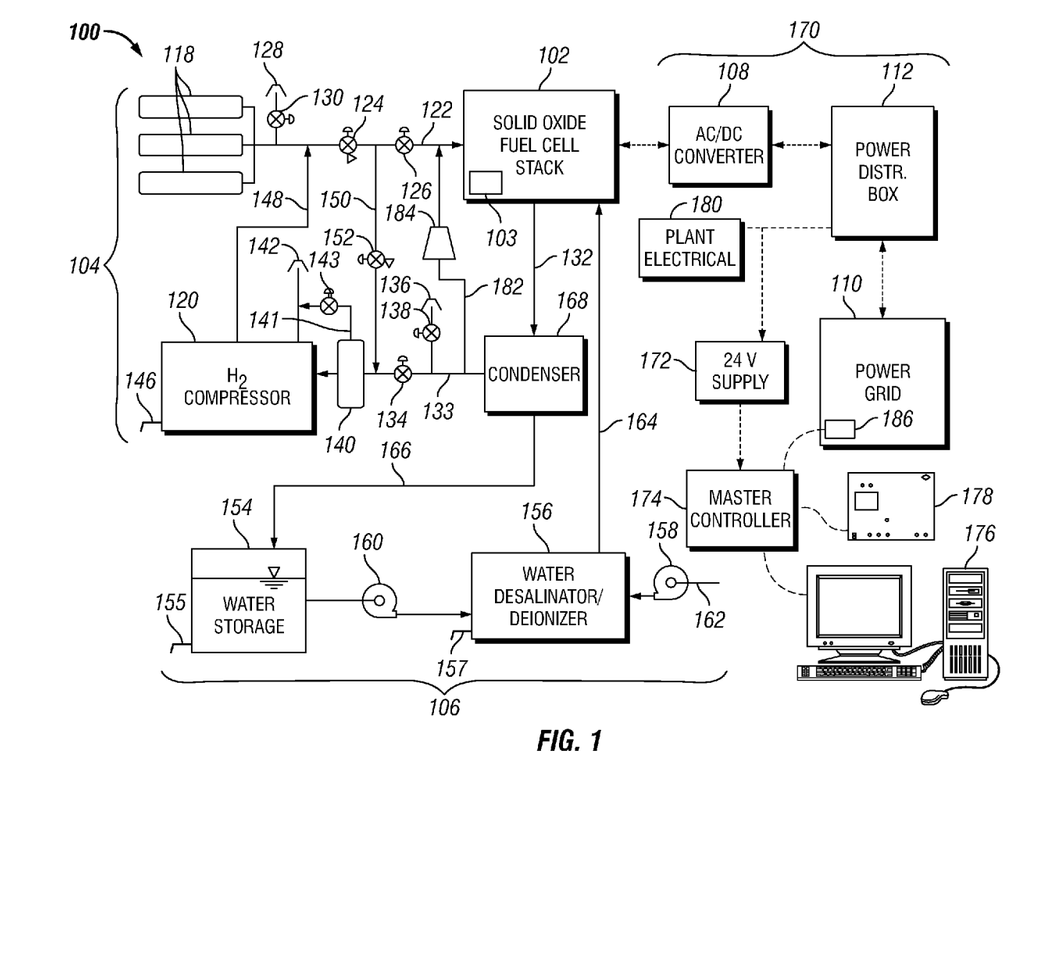
FIG. 1 is a schematic diagram of an embodiment of a Reversible Solid Oxide Fuel Cell (RSOFC) system.

Advantageously, a system and method have been developed for passively removing water from a compressed hydrogen gas stream that is produced in the electrolysis mode of an RSOFC system without significant loss of hydrogen, making the gas suitable for storage and later use as fuel for the RSOFC system. Shown in FIG. 1 is a schematic diagram of an embodiment of a Reversible Solid Oxide Fuel Cell (RSOFC) energy storage system 100, configured in accordance with the present disclosure. The RSOFC system 100 acts as an energy storage device to store and supply energy to an electrical grid 110 based on the demand requirements from the grid, or commands from a grid network manager. When excess power is generated by the grid or the grid demands the RSOFC system to store energy, the RSOFC system can operate in electrolysis or EL mode to generate, compress, and store $H_2$ from the electrolysis of water. This is accomplished by applying power from the gird 110 to the RSOFC system 100, when operating in EL mode. When power is needed by the grid 110, the stored $H_2$ is fed to the RSOFC system 100 operating in fuel cell or FC mode to produce power for the grid.

Viewing FIG. 1, the system 100 generally includes an RSOFC unit 102 (also referred to as a "fuel cell stack" or "fuel cell unit" or "fuel cell subsystem"), which is connected to a hydrogen compression and storage system, indicated generally at 104, and a process water system, indicated generally at 106. The fuel cell unit 102 is electrically coupled to an AC/DC converter 108, which connects to the local power grid 110 through a power distribution box 112. The fuel cell subsystem 102 includes sensors, controls, etc. (not shown), and can include its own subsystem controller 103, which can interface with the system master controller 174, described below. Alternatively, the fuel cell subsystem 102 and its associated sensors, controls, etc. can interface directly with the master controller 174, allowing the master controller to directly control the fuel cell unit 102.

While a single fuel cell unit 102 is shown in FIG. 1, this is for illustrative purposes only. Those of skill in the art will recognize that multiple fuel cell units or stacks 102 can be electrically coupled together in parallel and/or series to provide the desired output voltage and current from the fuel cell system 100. The RSOFC unit 102 produces power from oxidation of stored hydrogen (H$_2$) from the hydrogen compression and storage system 104 when in fuel cell or FC mode, and generates hydrogen (H$_2$) through electrolysis of water from the process water system 106 when in electrolysis or EL mode. The reversible solid oxide fuel cell unit 102 includes various features that are not specifically shown, such as an anode vent and anode vent valve, a stack preheater, condenser, etc. These types of components are generally known, and will be appreciated by those of skill in the art.

The hydrogen compression and storage system 104 includes a group or array of hydrogen fuel storage tubes or cylinders 118 and a hydrogen compressor 120. The hydrogen fuel storage tanks 118 are configured to store hydrogen gas at high pressure, and are coupled to the fuel cell unit 102 via a hydrogen fuel line 122. As used herein, the terms "high pressure" or "elevated pressure" in reference to the hydrogen storage, means any pressure above about 250 psi. In one embodiment, the hydrogen fuel storage tanks 118 and the system 100 as a whole are designed to store hydrogen at a pressure above 1000 psi and more particularly up to about 2500 psi, but much higher pressures can also be used. For example, some hydrogen fuel cell systems store hydrogen at pressures of 10,000 psi and higher. The hydrogen fuel line 122 includes a pressure reducing valve 124 and a main hydrogen control valve 126. A high pressure hydrogen vent 128 and its associated valve 130 are also coupled to the hydrogen fuel line 122 to vent hydrogen gas in case of overpressure in the hydrogen fuel storage array 118. The pressure reducing valve 124 allows hydrogen gas to be provided from the hydrogen fuel storage array 118, which is at high pressure (e.g. 2500 psi), to the RSOFC unit 102 at lower pressure (e.g. 75 psi) when the RSOFC unit 102 is operating in fuel cell mode.

The compressor 120 is coupled to the RSOFC unit 102 via the fuel cell output line 132, which directs low pressure output from the fuel cell 102 through a condenser 168, which initially separates a significant quantity of water from the fuel cell output, and thence into a low pressure hydrogen line 133. The compressor 120 receives low pressure hydrogen gas as output from the RSOFC unit 102 via the low pressure hydrogen line 133 when the RSOFC unit 102 is operating in electrolysis mode. A hydrogen recycle line 182 connects the low pressure hydrogen line 133 to the hydrogen fuel line 122, and includes a hydrogen recycle blower 184. This hydrogen recycle line 182 is useful in fuel cell mode for pumping residual hydrogen back for consumption in the fuel cell unit 102. When operating in fuel cell mode, some residual amount of hydrogen gas may pass through the fuel cell 102 without reacting and producing electricity. This residual hydrogen will be separated from the water vapor in the fuel cell output line 132 by the condenser 168, and is returned to the hydrogen fuel line 122 by the hydrogen recycle blower 184. Disposed in the low pressure line 133 are a compressor suction valve 134 and a fuel cell exhaust vent 136 and fuel cell exhaust vent valve 138. A buffer tank 140 is also coupled in line with the low pressure line 133 near the intake of the compressor 120. The buffer tank 140 is fed H$_2$ generated by the fuel cell subsystem 102. The buffer tank 140 is coupled to the compressor suction vent 142 via a buffer tank vent line 141 and buffer tank vent valve 143. Pressure is monitored in the buffer tank 140 to ensure that pressure does not get too high or too low, since this could cause elevated operating pressure in the fuel cell subsystem 102, or, in the case of low pressure, create a vacuum that could draw air in if there is a leak.

The compressor 120 includes a compressor suction vent 142, along with a drain 146 for allowing drainage of water from the compressor condenser (not shown). The compressor 120 is configured to receive low pressure hydrogen gas produced from the electrolysis of water in the fuel cell 102, and compress this gas and provide it to the hydrogen fuel storage array 118 via the compressed hydrogen supply line 148. A compressor recycle line 150 is also connected between the hydrogen fuel line 122 and the low pressure line 132, with a compressor recycle line valve 152 therein. The compressor recycle line valve 152 can be a pressure reducing valve, since the pressure in the low pressure line 133 is generally below the pressure in the hydrogen fuel line 122. Alternatively, a separate pressure reducer (not shown) can be included in the compressor recycle line 150. This compressor recycle line 150 is coupled to the hydrogen fuel line 122 downstream of the pressure reducing valve 124, and allows low pressure hydrogen to be recycled through the compressor 120 if desired, rather than being fed to the fuel cell unit 102, as discussed in more detail below. Other features of the compressor 120, such as a condenser, cooler, etc., are not shown in FIG. 1, but will be appreciated by those of skill in the art.

The process water system 106 includes a water storage tank or reservoir 154 and a desalinator/deionizer unit 156, along with a water supply pump 158 and a process water pump 160. The water storage tank 154 can include a drain 155 for allowing the process water to be drained from the tank. The process water system 106 provides deionized water to the RSOFC unit 102, whether from the water storage tank 154 or the deionizer unit 156 or both, when the RSOFC unit 102 is operating in electrolysis mode, and can receive exhaust water from the RSOFC unit 102 when the RSOFC unit 102 is operating in fuel cell mode (water output from a fuel cell operating in fuel cell mode is naturally deionized). Deionized water is desired for electrolysis in order to avoid the introduction of minerals and chemical species that can interfere with the electrolytic reactions of the fuel cell unit 102 or degrade its condition.

The deionizer unit 156 can be connected, as indicated at 162, to any suitable water supply, such as a local municipal potable water distribution system, or even to a sea water intake. The deionizer unit 156 can be configured to remove salt from the water through a multistep process of reverse osmosis, followed by a deionization step to further purify the water. Where the water supply is a potable water source, the process can involve only the deionization step. A sensor (not shown) can be placed on the exit of the deionizer unit 156 to measure the conductivity of the water, to determine the completeness of deionization and its suitability for use in the RSOFC unit 102. A drain 157 can be provided for drainage of brackish water from the deionizer unit 156.

The process water system 106 is coupled to the fuel cell unit 102 through the process water pump 160 via a water supply line 164 and a water return line 166, which can return water from the condenser 168 to the water storage tank 154. With this configuration, the RSOFC system 100 can be a closed-loop system, retaining and recycling process water whether operating in electrolysis or fuel cell mode. In fuel cell mode, water exhaust produced in the fuel cell unit 102 can be condensed by the condenser 168 and returned to the water storage tank 154 via the water return line 166. In electrolysis mode, process water can be drawn from the water storage tank 154 and/or the deionizer unit 156 and pumped via the process water pump 160 to the fuel cell unit 102, where the water is split into hydrogen, which is compressed and stored, and oxygen, which is exhausted to the atmosphere. Alternatively, the RSOFC system 100 can be an open-loop system, exhausting water vapor to the atmosphere when operating in fuel cell mode, and drawing water from the process water system 106 as needed when operating in electrolysis mode. In electrolysis mode, the condenser 168 acts as a heat exchanger, reducing the fuel cell exhaust temperature (e.g. from about 250° C. to about 40° C.) so that inlet temperatures for the anode recycle blower and the compressor are in a desired range. In this process, water is condensed out of the output stream, and this water is returned to the water storage reservoir 154 via the water return line 166.

The RSOFC 100 also includes an electrical subsystem, indicated generally at 170. The electrical subsystem includes the AC/DC converter 108, the power distribution box 112, as well as a connection from the power distribution box 112 to a 24 volt DC power supply 172 for powering electrical subsystems of the RSOFC system 100, including a master controller 174, and a connection to supply power to the plant electrical subsystems 180, sometimes also referred to as the "balance of plant" electrical. As noted above, the fuel cell unit 102 is electrically coupled to the local power grid 110 through the power distribution box 112. The AC/DC converter 108 is a bi-directional converter that converts DC output from the fuel cell unit 102 into grid power (e.g. 3 phase-4 wire, 480 VAC 60 Hz) for transmission into the power grid 110 when the fuel cell unit 102 is operating in fuel cell mode. Conversely, the AC/DC converter 108 also converts AC input from the power grid 110 into DC input for the fuel cell unit 102 when it is operating in electrolysis mode. The electrical subsystem 170 can also include other elements, such as a transformer (not shown) to convert grid power to 110V AC for utilities use, a ground fault detector (not shown) to measure any leakage current for the entire power distribution box 112, current sensors (not shown) for reading the current being drawn by each individual load, including total parallel current for all AC/DC loads, and a line monitor (not shown), which measures voltage on the electrical line connecting the RSOFC system 100 to the power grid 110 to read both grid voltage and current. The power grid 110 can include a grid controller 186, which is coupled (e.g. via Ethernet, Internet, wireless connection, etc.) to the master controller 174 and provides signals indicating a power demand or power surplus condition of the grid 110. When the grid 110 demands power, the master controller 174 can cause the system 100 to enter fuel cell mode, and produce power for the grid 110, so long as it has a suitable fuel supply. Conversely, when the grid 110 has a surplus of power, the master controller 174 receives a signal from the grid controller 186 indicating this, and causes the system 100 to enter electrolysis mode to produce and store hydrogen gas.

The power grid 110 can also include grid-coupled solar, wind or other renewable energy generation systems. The RSOFC unit 102 can thus receive electricity from these renewable energy generation systems when operating in electrolysis mode, thus allowing the system 100 to store excess energy that is generated from these variable and intermittent sources. It is to be understood that wind and solar generation systems are only two examples of many types of energy input sources that could be coupled to the RSOFC system 100 through the grid 110. Those of skill in the art will recognize that there are other energy input sources that could be associated with the RSOFC system 100.

The master controller 174 is a microprocessor device, having a processor and system memory, and provided with suitable software for monitoring and controlling all of the systems and connections of the RSOFC system 100. The master controller can include or be coupled to a computer terminal 176 and/or a control panel 178 for allowing user input and monitoring.

The RSOFC system 100 also includes a variety of sensors (not shown) that are either associated directly with various components of the RSOFC system 100, or are associated with fluid conduits, valves, electrical connections, etc. These sensors are coupled to provide sensor data (e.g. via wired electrical connections) to the master controller 174. For example, the hydrogen fuel line 122, the low pressure hydrogen line 133, the compressed hydrogen supply line 148 and any other components that handle the storage or transmission of hydrogen can include sensors for pressure, temperature, flow rate, hydrogen presence, water content, etc. Pressure in the hydrogen storage tanks 118 and downstream regulated pressure can be monitored, and values can be sent to the master controller 174. Other sensors can be associated with the various valves to provide indications of valve state (e.g. open or closed). Similarly, pressure, temperature and flow sensors, as well as pump operating sensors can also be associated with each component of the process water system 106.

Electrical sensors and switches (not shown) can also be associated with the AC/DC converter 108 and the power distribution box 112 and their related electrical connections, both internally and with the power grid 110, to allow the master controller to receive input signals related to the conditions of the electrical subsystem 170 and the control system of the power grid 110. The master controller 174 is thus coupled to all components of the RSOFC system 100 and can control the modes of the RSFOC unit 102 and the related devices (e.g. the hydrogen compression and storage system 104 and the process water system 106) based on sensor data.

The RSOFC system 100 can also include a variety of other subsystems that are not specifically shown in FIG. 1, but can be included for control and operation, and will be familiar to those of skill in the art. For example, the various valves of the RSOFC system 100 can be power actuated valves, allowing remote control and monitoring of their state. For example, these can be pneumatically actuated valves, and the system 100 can include a compressed air subsystem (not shown) for providing power for actuating all of these valves in response to electrical control signals from the master controller 174. The compressed air pressure can be measured and monitored at the output of the air compressor (not shown) in order to be maintained higher than some desired working pressure, such as 80 psi.

The RSOFC system 100 can also include a flammable gas detection system (not shown) that includes multiple sensors to monitor for a combustible environment that could occur in the event of a leak of hydrogen. Sensor signals from the flammable gas detection system can be transmitted to the master controller 174, which analyzes these signals for any indication of a combustible environment.

The RSOFC system 100 can also include a thermal management system (not shown) that is configured to supply cooling water to the $H_2$ compressor and to the fuel cell unit 102 for its condenser. This cooling water system can be designed to supply an inlet temperature of about 25° C. and about 30 psi pressure to each system, for example.

Advantageously, the RSOFC system 100 shown in FIG. 1 can be scaled up or down as needed for a given location and application. It has been suggested, for example, that this type of system can be provided in a modular form in a standard size shipping container or the like, so that it can be easily transported to any location where it is to be used.

The various sensors of the RSOFC system 100 indicate the status of the various components of the system, and, based on the sensor input, the master controller 174 can determine a state of the RSOFC system 100 by applying a conditional logic algorithm. The master controller 174 can thus transition the RSOFC system between the fuel cell mode and the electrolysis mode based upon the sensor data and the system state. The result is an energy storage system that converts excess energy into hydrogen when in electrolysis mode, and compresses that gas for later use. In order to stabilize the power grid 110 with continuous power, the RSFOC system 100 can then switch to fuel cell mode and use the stored hydrogen to produce energy for the grid 110. The master controller 174 can thus control and orchestrate the various modes of the RSOFC system 100 to help ensure that power output meets the demand for power, and that excess power is not lost.

Figure 2:
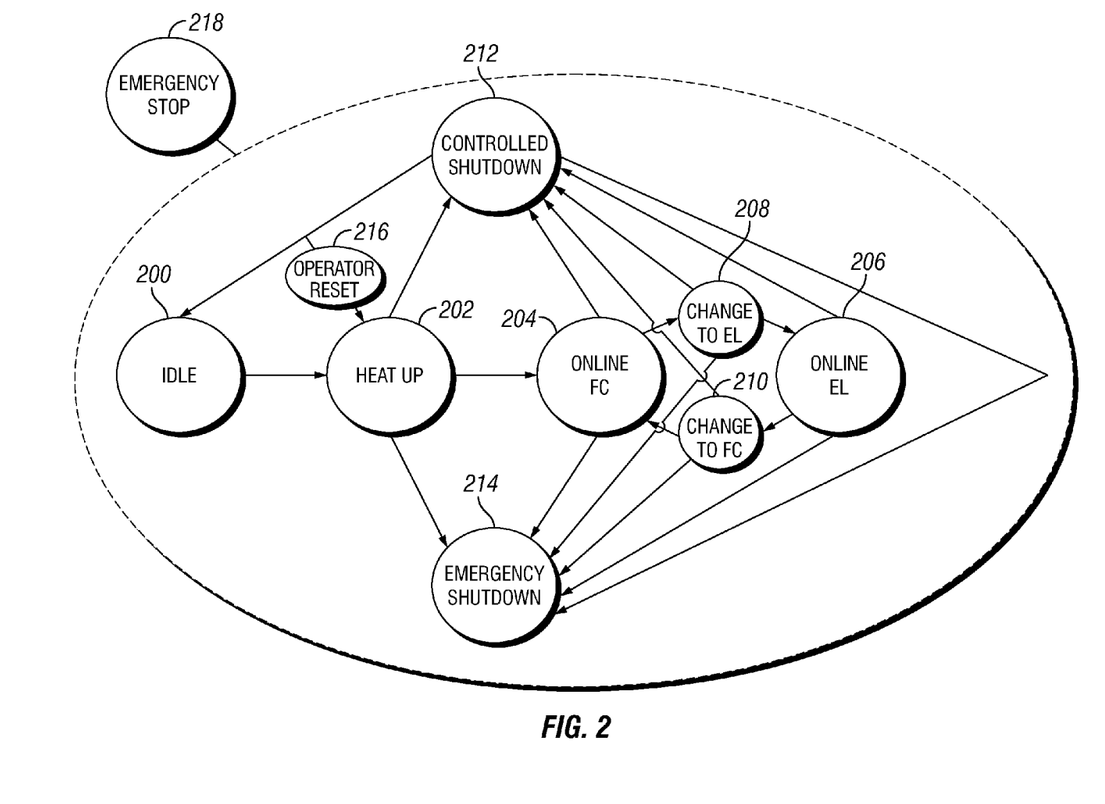
FIG. 2 is a mode transition diagram for an RSOFC system like that of FIG. 1.

As noted above, the master controller 174 interfaces with the control system of the power grid 110 and the various subsystems of the RSOFC system 100 to determine mode transition and status of the overall system. Shown in FIG. 2 is a mode transition diagram for an RSOFC system like that of FIG. 1. The RSOFC system 100 has four general operational modes, which are idle mode 200, heat up mode 202, online FC mode 204 and online EL mode 206. Generally, the master controller (174 in FIG. 1) can place the system in FC (fuel cell) mode 204 or EL (electrolysis) mode 206 based on the commands or power requirements from the grid 110. Between the power generation mode 204 and hydrogen generation mode 206 are two changeover modes—a changeover from fuel cell (FC) to electrolysis (EL) mode 208, and a changeover from electrolysis (EL) mode to fuel cell (FC) mode 210.

At any time during operation in heat up mode 202, online FC mode 204, online EL mode 206, or during the changeover modes 208 and 210, the system can be prompted (e.g. by an operator or through programmed operation by the master controller 174) into a controlled shutdown mode 212, in which the system will return to idle mode 200 or await an operator reset signal 216. In controlled shutdown mode 212 the master controller leaves the coolant pump ON in order to provide the necessary cooling to the system. A list of measurements are recorded and monitored. All subsystems follow their own controlled shutdown protocol and send confirmation to the master controller that controlled shutdown mode 212 has been successfully entered. The system can enter idle mode 200 when the fuel cell subsystem has indicated it has completed its controlled shutdown. When returned to Idle, the pump is turned off and all valves are returned to their fail safe mode.

Alternatively, at any time during operation in the above-mentioned modes, the system can be prompted by the master controller 174 into an emergency shutdown mode 214. An emergency shutdown is an immediate shutdown of the system due to an operational failure. Emergency shutdown 214 can be initiated in response to a variety of situations, such as a signal indicating a combustible environment (i.e. a hydrogen leak), a failure of a subsystem of the RSOFC system 100, etc. In one embodiment, emergency shutdown only occurs if there is an electrical ground fault detected or a combustible gas sensor (not shown) detects gas concentrations at some level relative to a combustibility limit (e.g. sensing combustible gasses at 50% of a lower explosion limit). After the system enters emergency shutdown mode 214, the system remains in this mode until the fuel cell indicates that it is "shutdown," and until the operator manually resets the system. The operator cannot reset the system until the fuel cell is "shutdown." At this point the system can go into idle mode 200. The Emergency Shutdown mode 216 occurs when there is a catastrophic operational failure to one of the RSOFC subsystems. In such a situation, all equipment is turned off and placed into fail safe mode. All valves are de-energized, and pumps are turned off. Advantageously, the system is designed to fail safe. However, in emergency shutdown mode 214, selected sensors will remain online to allow monitoring, while the other subsystems of the RSOFC system 100 are shut down. The sensor systems remain online to monitor components of the system.

Further, the conditional logic algorithm of the master controller 174 or activation of an Emergency-Stop button (not shown) by an operator can shift the system into emergency stop mode 218 at any time. The emergency stop button opens the main circuit breaker to the RSOFC system 100, thus cutting all power to the system, including power to sensors, etc. In order to restart the system after an emergency stop, the main breaker is first closed to restore power, and the system startup procedures outlined in FIG. 3 are then commenced.

As indicated above, the primary function of the master controller 174 is to orchestrate the operation of the subsystems of the RSOFC system 100 to provide and store electrical power for the grid 110. The master controller 174 receives sensor inputs from the various subsystems, and, based on these input values, the conditional logic algorithm of the master controller will instruct the RSOFC subsystems to enter the appropriate mode, and/or to transition from one mode to another. It has been found that substantial care is desirable when switching between fuel cell (SOFC) and electrolysis (SOEC) modes. That is, the FC to EL and EL to FC changeover modes 208, 210 warrant significant control to avoid certain undesirable conditions. For example, it is desirable to remove excess water and/or hydrogen from the system before the FC to EL transition occurs, since this transition involves going from a high $H_2$ concentration to a high water concentration. Accordingly, in Changeover FC to EL mode 208 the master controller 174 reads an array of measurements from the sensor data until the system is ready to switch to EL mode 206. The conditional logic control algorithm embedded in the system master controller 174 looks at system parameters and states along with micro-grid commands to determine when and what transition should occur.

Figure 3:
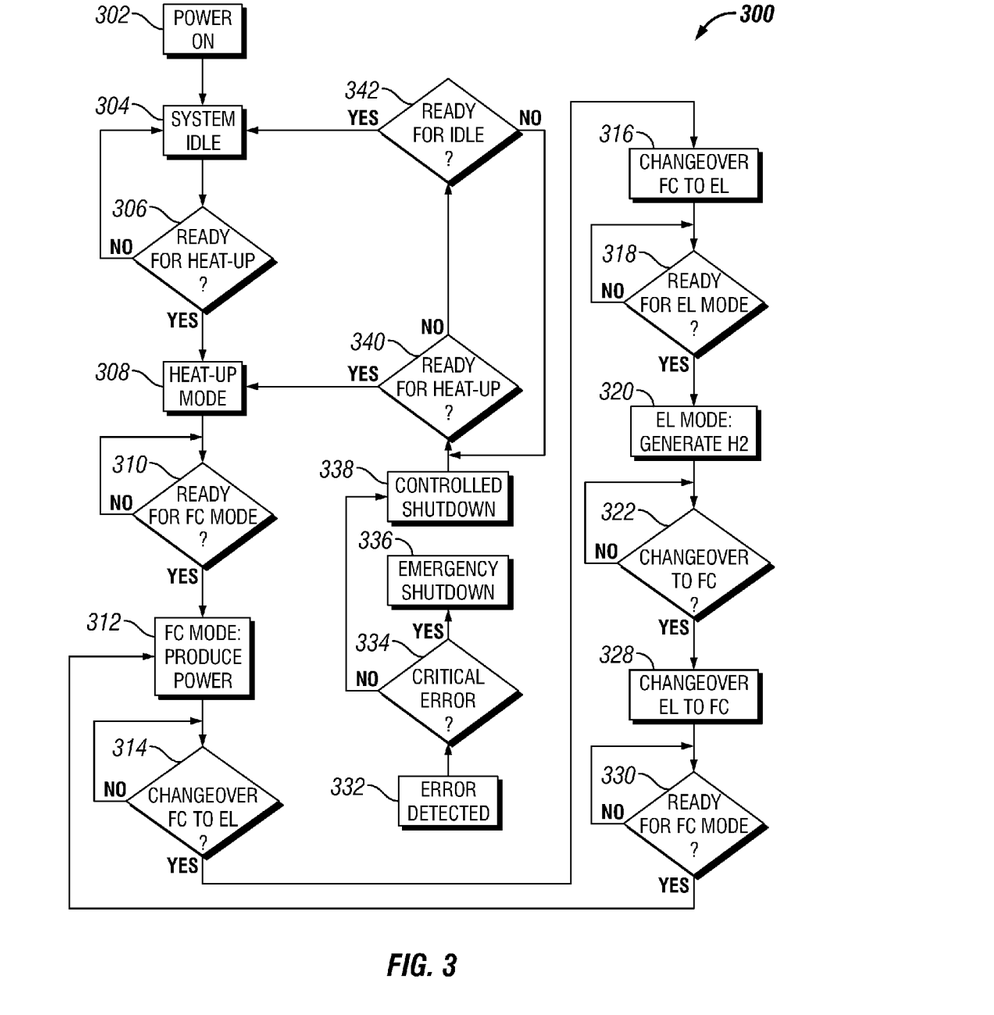
FIG. 3 is a high level flowchart of an embodiment of a method for controlling an RSOFC system in accordance with the present disclosure.

Provided in FIG. 3 is a high level flowchart showing one embodiment of an operational method, indicated generally at 300, by which the master controller 174 controls the RSOFC system 100. As shown in FIG. 2 and discussed above, the RSOFC system 100 has four basic operational modes, which are also shown in FIG. 3. These modes include an idle mode 304, a heat up mode 308, online FC mode 312, and online EL mode 320. There are also two changeover modes: a changeover FC (fuel cell) to EL (electrolysis) mode 316, and a changeover EL to FC Mode 328.

After system start, indicated at block 302, the next step is to enter idle mode 304 until the fuel cell is ready for heat up, as indicated at block 306. The system remains in idle mode until the fuel cell is ready for heat up, as indicated at block 306. When the system is ready, as determined by the master controller 174, it enters heat up mode 308, during which the fuel cell stack is heated to its desired operating temperature range. Until the desired temperature has been achieved and other sensors indicate the fuel cell is ready, as indicated at block 310, the system does not move forward. Once these conditions are met, the system enters FC (fuel cell—power generation) mode 312.

The system remains in FC mode 312 until the grid indicates that power is not needed, or the $H_2$ supply is indicated to be too low for continued fuel cell mode, as indicated at block 314. When these latter indications are received, the system shifts to a first changeover mode—change over FC to EL 316, which involves system adjustments to allow transition from producing power from the fuel cell to consuming power and generating hydrogen. The changeover FC to EL mode continues until the master controller determines that the RSOFC is ready for online EL (electrolysis) mode (or, where there is a separate controller 103 for the fuel cell subsystem 102, until the controller 103 of the fuel cell unit 102 signals the master controller 174 that it is ready for electrolysis mode), as indicated at block 318. Once these conditions are met, the system enter EL mode, block 320, and generates and stores hydrogen.

When the system changes from fuel cell (FC) mode to electrolysis (EL) mode (316 in FIG. 3), hydrogen gas is redirected from a condition in which it is vented to atmosphere, to a condition in which it feeds the compressor 120. This is accomplished by closing the vent valve 138 and opening the compressor suction valve 134. When the compressor 120 is on, a desired suction pressure is maintained in the buffer tank 140 (e.g. ~0.2 psi). Pressure control via this configuration of the buffer tank 140 and related structures ultimately sets the fuel cell system back pressure, Which is an advantageous control aspect for the integrated RSOFC system 100.

In Change over FC to EL mode 316 the starting pressure in the low pressure line 133 feeding the $H_2$ compressor 120 is subject to a specific control method that insures that the line pressure is prepared for transitioning the product gas from the fuel cell 102 and setting the fuel cell system operating pressure. In changeover FC to EL mode 316, the compressor recycle line valve 152 is opened to set the pressure in the low pressure line 133. In the event there is a higher than desired pressure, the buffer tank vent valve 143 can be opened to purge the gas until the desired pressure set point is reached. This prevents shocking the fuel cell unit 102 during transition to feeding the $H_2$ compressor, and helps ensure that air is not sucked into the compressor 120 due to a resulting negative pressure when the compressor is initially turned on.

Another advantageous control capability for the RSOFC system 100 is its ability to keep the fuel cell 102 "online" in the event there is a failure in the compression system 120. Thermal cycling of the fuel cell 102 can cause accelerated degradation of its components, and it is thus desirable to keep the system "hot." Advantageously, the present system implements a "vent" strategy in which certain alarms will shut down the compressor 120, and switch the vent valve 138 and compressor suction valve 134 to positions allowing the gas to vent through the fuel cell exhaust vent 136, as done in FC-EL mode 316. In this condition $H_2$ is still being produced, but the fuel cell unit 102 will remain hot until the alarm-inducing condition can be resolved. Once any fault is remedied, an operator reset will allow the system 100 to resume compressing $H_2$ gas. The process to maintain proper line pressure in the low pressure line 133, discussed above, is also implemented in this condition.

The EL mode 320 can continue until the hydrogen storage array (118 in FIG. 1) is full. Once the hydrogen storage array is full, the master controller determines whether the system is ready to transition from EL to FC mode, as indicated at block 322. This determination can be based on factors such as whether the power grid is indicating a demand for power. If neither of these conditions apply, the master controller can open a system vent (e.g. the exhaust vent 136 in FIG. 1), and the system can continue to produce hydrogen until one of those two conditions change. If power is not needed and the hydrogen storage array 118 is full, the system can remain in this mode as long as desired. However, there is usually a demand for power in the grid, and thus this condition is not likely to persist for a long period of time. Additionally, the system can enter this vent state if some fault of the compressor is detected, and the system is not yet ready to changeover to fuel cell mode.

Once the power grid indicates a demand for power, the system shifts to a second changeover mode—change over EL to FC 328, which involves system adjustments to allow transition from consuming power and generating hydrogen back to producing power by the fuel cell. The system remains in this changeover mode 328 until the master controller determines that the fuel cell is again ready to enter fuel cell (FC) mode (e.g. based on whether the fuel cell is in proper operating condition), as indicated at block 330, after which the system can return to FC (fuel cell—power generation) mode 312.

Throughout operation of the process shown in FIG. 3, the master controller 174 continually receives sensor input and evaluates the system condition. At any point, if an error or degraded condition is detected, the system can react in a variety of ways. When an error is detected, as indicated at 332, the master controller determines, based upon its programming, the severity of the error, as indicated at 334. If the error is a critical error, such as an electrical ground fault or detection of combustible gas above some threshold level, the system can proceed directly to the emergency shutdown stage 336, which terminates operation of the system, as discussed above with respect to FIG. 2. However, if the error is not one requiring an emergency shutdown, but is more than a minor error that merely produces an alarm indication, the system can proceed to a controlled shutdown 338.

Following controlled shutdown 338, the system remains ready for reset, either to the idle mode 304 or to the heat-up mode 308. Specifically, the master controller inquires at block 340 whether the fuel cell system is ready to re-enter heat-up mode. If so, the system proceeds to heat-up mode 308. If not, the master controller next considers whether the system is ready to enter idle mode 306, and transitions to that mode if the answer to the query at block 342 is affirmative. However, if the answers to both of these queries are negative, the system can repeat this series of inquiries until one or the other turns positive, or until some programmed limit is reached.

Figure 4:
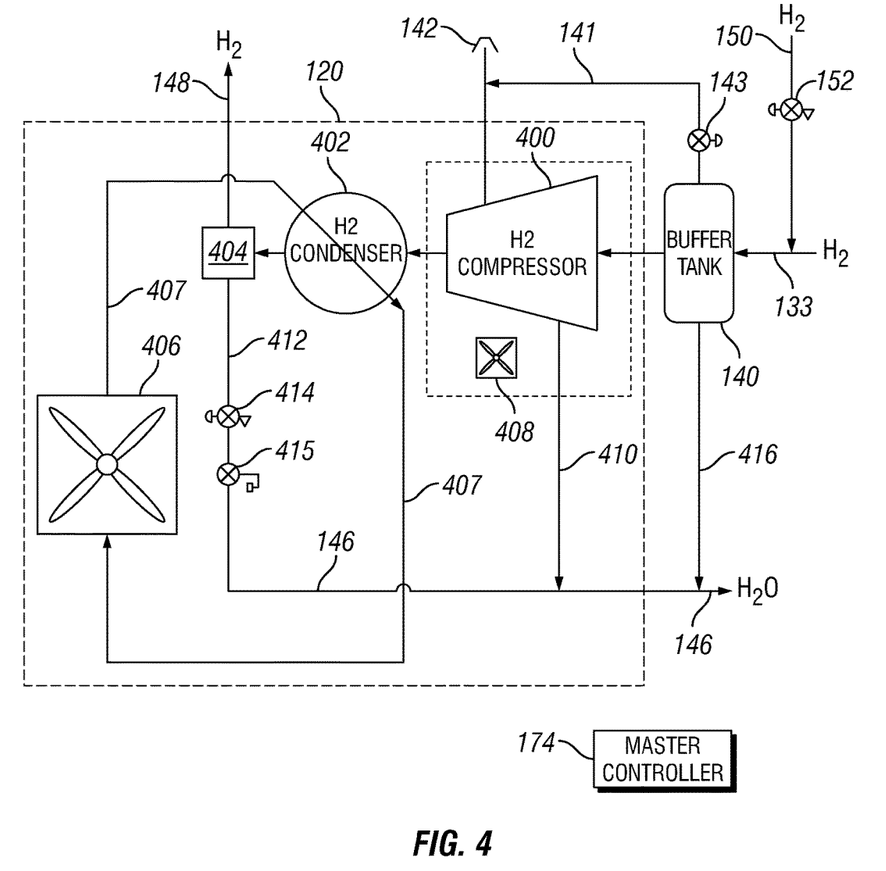
FIG. 4 is a schematic diagram of a hydrogen compression and water removal system suitable for use with an RSOFC system like that shown in FIG. 1, in accordance with the present disclosure.

Shown in FIG. 4 is a schematic diagram of the hydrogen compressor system 120. The compressor system 120 is configured to receive low pressure hydrogen gas produced from the electrolysis of water in the fuel cell 102, and compress this gas to high pressure (e.g. up to ~2500 psi or more) and provide this compressed gas to the hydrogen fuel storage array (118 in FIG. 1) via the compressed hydrogen supply line 148. The compressor system 120 is both a hydrogen compression and water removal system that is suitable for use with the RSOFC system 100 when it is operating in electrolysis mode, or when hydrogen gas is recycled via the recycle line 150.

The compressor system 120 generally includes a compressor unit 400, a condenser 402, a water trap 404, and a chiller 406 with a coolant line 407 that circulates between the condenser 402 and the chiller 406. All of the elements of the compressor system 120 are controlled by the master controller 174. Low pressure hydrogen gas produced by the fuel cell unit 102 in electrolysis mode is directed toward the compressor system 120 via the low pressure hydrogen line 133. Alternatively, low pressure hydrogen gas can be directed toward the compressor system 120 via the compressor recycle line 150, which is connected between the hydrogen fuel line (122 in FIG. 1) and the low pressure line 133, via a compressor recycle line valve 152. The low pressure hydrogen gas will typically have a gage pressure below some minimum threshold, such as about 0.2 psig, for example.

The low pressure hydrogen in the low pressure hydrogen line 133 first enters the buffer tank 140, which has a volume selected to help smooth out any fluctuations in the pressure and flow rate of the incoming hydrogen. The incoming hydrogen is generally saturated, having a water vapor content of about 7%, and is likely to have a temperature of about 40° C. Any condensation of water from the hydrogen gas within the buffer tank 140 can be directed to the compressor drain line 146 via the buffer tank drain outlet 416.

The low pressure hydrogen from the buffer tank 140 is then fed into the compressor unit 400, where it is compressed. The compressor unit 400 includes a compressor suction vent 142, and the buffer tank 140 is also coupled to the compressor suction vent 142 via a buffer tank vent line 141 and buffer tank vent valve 143. The compressor unit 400 includes an air-cooled heat exchanger 408, which maintains the temperature of the gas through the compression phase. This heat exchanger can be a tube-in-tube heat exchanger, such as are available from a variety of commercial sources. Those of skill in the art will be aware that the process of compressing hydrogen gas from a saturated RSOFC outlet stream will naturally cause some portion of the water in the gas stream to condense in the compressor 400. This condensation can be at some pressure above atmospheric pressure, depending on the stage of compression, and is collected in the compressor 400, then directed to the compressor drain line 146 via the compressor unit drain outlet 410.

Compression of the $H_2$ gas will naturally tend to increase the temperature of the gas, causing the gas at the outlet of the compressor 400 to be quite hot. The heat exchanger 408 can cool the compressed $H_2$ gas at the outlet of the compressor 400 to a lower temperature, such as a temperature that is about the same as its initial temperature (e.g. about 40° C.), though it will be at a high pressure. As noted above, the term "high pressure" in reference to the compressed hydrogen is used to mean any pressure above about 250 psi. In one embodiment, the compressor 120 is designed to compress hydrogen to a pressure of about 2500 psi, but much higher pressures can also be used. For example, some hydrogen fuel cell systems store hydrogen at pressures of 10,000 psi and higher. After the hydrogen is compressed and discharged from the compressor 400, its water content will be in the range of about 500 ppm. It is desirable, however, that the water content of the $H_2$ be less than about 100 ppm prior to storage, which is considered an acceptable level for storage in commercial $H_2$ tubes. Consequently, additional water removal is desired.

Typical water removal systems that have been used in preparing hydrogen gas for fuel cell use are unsuitable for use in the sort of system disclosed herein. Typical PEM electrolysis systems used for generating $H_2$ for fuel cell vehicle refueling stations operate at higher differential pressures that allow them to use filtration systems upstream of the compression. As noted above, the hydrogen pressure at the intake of the compressor 400 is below about 1 psi, such as around 5" to 6" $H_2O$, or about 0.2 psi, which makes filtration systems that depend on differential pressures impractical. Additionally, such prior systems allow very high water removal, but also result in loss of $H_2$ in the process. For example, a typical pressure swing adsorption column is often used to purify $H_2$ for fuel cell vehicle applications, which results in a 10-20% loss in product $H_2$. The $H_2$ that is used for fuel cell vehicles requires very high (e.g. 99.9%) purity. In the RSOFC system 100 disclosed herein, however, the solid oxide fuel cell 102 is run as an electrolyzer to produce $H_2$. SOFC systems produce $H_2$ that is saturated with water vapor, but operate at relatively low differential pressure (e.g. less than about 0.3 psig). Therefore typical water removal systems that require a sizeable pressure drop ahead of the compression step are not practical.

Advantageously, the present disclosure provides a method for removing water from a saturated $H_2$ product stream from the SOFC unit 102 operating in electrolysis mode at approximately atmospheric pressure. The method is passive, and does not include electrical pressure switches, and causes negligible loss in $H_2$. The compressor unit 400 is connected to the condenser 402, which is coupled to the chiller 406. The compressed $H_2$ exiting the compressor unit 400 will have a temperature of about 40° C. and a high pressure, such as about 2500 psi, with a water content of about 500 ppm. In the condenser this gas stream is cooled down to a low temperature, e.g. about 10° C., to reduce the moisture to less than 100 ppm, which is an acceptable level for storage in commercial $H_2$ tubes for this type of RSOFC system 100.

The water that is drawn out of the hydrogen gas in the condenser 402 is captured by the water trap 404, while the compressed hydrogen gas travels on to the hydrogen storage system via the hydrogen supply line 148. The water trap 404 can be a coalescing filter that captures condensed water droplets and separates them from the high pressure gas, which flows one way, while the condensed water flows to the water trap drain line 412. Suitable coalescing filters for high pressure operation are commercially available from a variety of sources. The condensed water then flows through a pressure regulating valve 414, which reduces the pressure of the condensed water. This pressure reduction can be from about 2500 psi to about 75 psi. Pressure reducing valves that can be used for this purpose are commercially available from various sources. After pressure reduction, the condensed water passes through a ball float drain valve 415 that allows the condensed water to flow to the compressor drain line 146. Suitable ball float drain valves that can be used for this purpose are available from a variety of commercial sources. Whenever a sufficient volume of water condensate has accumulated in the ball float valve 415, the valve releases most of that water into the compressor drain line 146 (which is at substantially atmospheric pressure), but prevents any gas that might have passed through the regulator valve 414 and into the ball float valve from escaping.

Figure 5:
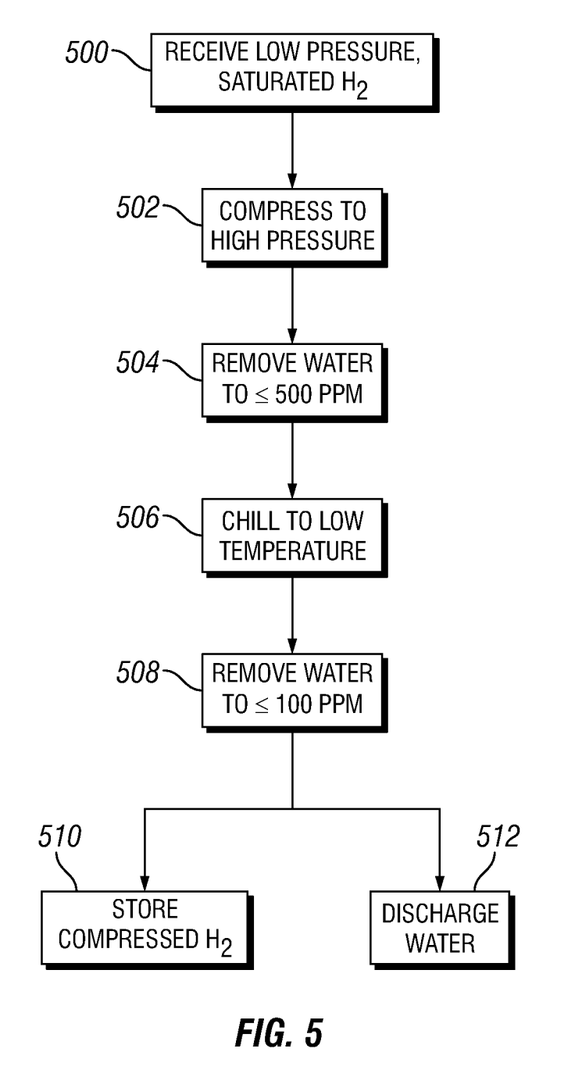
FIG. 5 is a flowchart outlining the steps in a method for high pressure, passive condensing of water from hydrogen in a reversible solid oxide fuel cell system in accordance with the present disclosure.

Shown in FIG. 5 is a flowchart outlining the steps in a method for high pressure, passive condensing of water from hydrogen in an RSOFC system in accordance with the present disclosure. As discussed above, the method includes receiving low pressure, saturated $H_2$, 500. This $H_2$ is presumably from a solid oxide fuel cell system operating in electrolysis mode, but can be from other sources. The low pressure $H_2$ is then compressed to about 2500 psi at step 502, and the condensate created through this compression step is removed at step 504, dropping the water content to around 500 ppm. The $H_2$ gas stream is then chilled to about 10° C. at step 506, allowing the condensate to be removed to drop the water content below 100 μm at step 508. Thereafter, the compressed and dewatered $H_2$ can be stored in storage tanks or the like at step 510, for future use in the RSOFC system 100, while the water condensate is directed to the compressor drain at step 512.

The RSOFC system 100 and high pressure, passive water condensing and removal system 120 of water provides a fully integrated, grid-tied RSOFC energy storage system. It provides a passive method for removing moisture from a stream of compressed $H_2$ to a level that is suitable for $H_2$ storage, without substantial loss of product gas, and that is suitable for use with a reversible SOFC system that is configured to both store and generate energy from $H_2$ gas.

Although various embodiments have been shown and described, the present disclosure is not so limited and will be understood to include all such modifications and variations are would be apparent to one skilled in the art.

What is claimed is:

1. A method for passively removing water from a stream of hydrogen gas produced from a Reversible Solid Oxide Fuel Cell (RSOFC) unit operating in electrolysis mode, comprising: cooling a stream of hydrogen gas in a condenser to separate out a first quantity of water from the stream of hydrogen gas; receiving the stream of hydrogen gas into a compressor, the stream of hydrogen gas having an initial pressure below about 1 psig and an initial temperature above about 25° C.; compressing the stream of hydrogen gas to an elevated pressure; chilling the compressed stream of hydrogen gas to a low temperature; and condensing a second quantity of water from the compressed and chilled stream of hydrogen gas until the water content of the stream of hydrogen gas is below about 100 ppm.

2. A method in accordance with claim 1, further comprising removing the second quantity of water from the stream of hydrogen gas in the compressor.

3. A method in accordance with claim 1, wherein condensing a second quantity of water from the compressed and chilled stream of hydrogen gas comprises passing the compressed and chilled stream of hydrogen gas through water trap.

4. A method in accordance with claim 3, further comprising removing the second quantity of water from the water trap, reducing pressure of the second quantity of water, and draining at least a portion of the second quantity of water into a drain line through a ball float drain valve.

5. A method in accordance with claim 1, further comprising storing the compressed hydrogen gas in a storage container for later use as fuel for a solid oxide fuel cell.

6. A method in accordance with claim 1, wherein the stream of hydrogen gas has an initial pressure below 0.25 psig and an initial temperature of about 40° C.

7. A method in accordance with claim 1, wherein the stream of hydrogen gas has an initial water content of about 7%.

8. A method in accordance with claim 1, wherein the compressed stream of hydrogen gas prior to chilling has a water content of about 500 ppm.

9. A method in accordance with claim 1, wherein the elevated pressure is at least 250 psi.

10. A method in accordance with claim 1, wherein chilling the compressed stream of hydrogen gas comprises chilling the compressed stream of hydrogen gas to a temperature below about 10° C.

11. A method for passively removing water from a stream of saturated hydrogen gas produced from a Reversible Solid Oxide Fuel Cell (RSOFC) unit operating in electrolysis mode, comprising:

receiving a stream of Saturated hydrogen gas produced from a Reversible Solid Oxide Fuel Cell (RSOFC) unit operating in electrolysis mode, the stream of hydrogen gas having an initial pressure below about 0.5 psig and an initial temperature above about 25° C.;
compressing the stream of hydrogen gas with a compressor to a pressure above 1000 psig:
chilling the compressed stream of hydrogen gas to a temperature below about 10° C.;
passively condensing water from the compressed and chilled stream of hydrogen gas to produce a water content of the stream of hydrogen gas below about 100 ppm, separating the water condensate from the H gas; and
storing the compressed hydrogen gas in a storage container for later use as fuel for the RSOFC unit.

12. A method in accordance with claim 11, further comprising removing condensed water from the stream of hydrogen gas in the compressor.

13. A method in accordance with claim 11, wherein compressing the stream of hydrogen gas comprises compressing the stream of hydrogen gas to a pressure of at least about 2500 psig.

14. A method in accordance with claim 11, wherein condensing water from the compressed and chilled stream of hydrogen gas comprises passing the compressed and chilled stream of hydrogen gas through a water trap.

15. A system for passively removing water from a stream of hydrogen gas produced from a Reversible Solid Oxide Fuel Cell (RSOFC) unit operating in electrolysis mode, comprising: a condenser for cooling the stream of hydrogen gas and separating out a first quantity of water from the stream of hydrogen gas; a conduit, coupled to an outlet of the condenser and configured to deliver a stream of saturated hydrogen gas having an initial pressure below about 1 psig and an initial temperature above about 25° C.; a compressor, coupled to the conduit and configured to compress the stream of hydrogen gas to an elevated pressure; a chiller, configured to chill the compressed stream of hydrogen gas to a low temperature; and a water trap, configured to passively receive water condensate from the compressed and chilled stream of hydrogen gas as the stream passes therethrough, and to separate the compressed and dewatered hydrogen from the condensate, the compressed and dewatered hydro gen having a water content of less than about 100 ppm.

16. A system in accordance with claim 15, further comprising a heat exchanger, associated with the compressor, configured to reduce a temperature of the compressed hydrogen gas.

17. A system in accordance with claim 16, wherein the elevated pressure is above 250 psi.

18. A system in accordance with claim 15, wherein the chiller is configured to chill the compressed stream of hydrogen gas to a temperature below about 10° C.

19. A system in accordance with claim 15, wherein the water trap comprises a coalescing filter, configured to draw condensate from the compressed and chilled stream of hydrogen gas, and further comprising:

a pressure regulator, coupled to receive the condensate from the coalescing filter, configured to reduce a pressure of the condensate; and
a ball float drain valve, coupled to the receive the condensate from the pressure regulator, configured to periodically transfer the condensate to a drain.

20. A system in accordance with claim 15, further comprising a suction vent and buffer tank, in fluid communication with an intake of the compressor, configured to maintain the initial pressure below about 0.5 psig.

* * * * *